(12) United States Patent
Johnson

(10) Patent No.: US 8,296,793 B2
(45) Date of Patent: Oct. 23, 2012

(54) SYSTEM FOR BROADCASTING TARGETED ADVERTISEMENTS

(75) Inventor: John Peter Johnson, Middlesex (GB)

(73) Assignee: John Peter Johnson, Stanmore (GB)

( * ) Notice: Subject to any disclaimer, the term of this patent is extended or adjusted under 35 U.S.C. 154(b) by 1081 days.

(21) Appl. No.: 10/554,306

(22) PCT Filed: Apr. 5, 2004

(86) PCT No.: PCT/GB2004/001459
§ 371 (c)(1),
(2), (4) Date: Oct. 4, 2005

(87) PCT Pub. No.: WO2004/088985
PCT Pub. Date: Oct. 14, 2004

(65) Prior Publication Data
US 2007/0011700 A1  Jan. 11, 2007

(30) Foreign Application Priority Data
Apr. 4, 2003 (GB) .................................. 0307763.3

(51) Int. Cl.
*H04N 7/10* (2006.01)
(52) U.S. Cl. ...................................... 725/34; 705/14.49
(58) Field of Classification Search ............. 725/32, 725/34–36; 705/14.4–14.73
See application file for complete search history.

(56) References Cited

U.S. PATENT DOCUMENTS

| 5,907,321 | A | 5/1999 | Grossman et al. | |
| 6,286,140 | B1* | 9/2001 | Ivanyi | 725/14 |
| 6,698,020 | B1* | 2/2004 | Zigmond et al. | 725/34 |
| 2001/0032128 | A1* | 10/2001 | Kepecs | 705/14 |
| 2002/0038455 | A1* | 3/2002 | Srinivasan et al. | 725/35 |
| 2002/0056088 | A1 | 5/2002 | Silva, Jr. et al. | |
| 2002/0083443 | A1* | 6/2002 | Eldering et al. | 725/34 |
| 2002/0124253 | A1* | 9/2002 | Eyer et al. | 725/34 |
| 2002/0129368 | A1 | 9/2002 | Rampulla et al. | |
| 2002/0176391 | A1* | 11/2002 | Hermann et al. | 370/338 |
| 2004/0111741 | A1* | 6/2004 | DePietro | 725/34 |
| 2004/0148625 | A1* | 7/2004 | Eldering et al. | 725/34 |
| 2005/0193410 | A1* | 9/2005 | Eldering | 725/34 |

FOREIGN PATENT DOCUMENTS
EP  1 207 695 A1  5/2002

* cited by examiner

*Primary Examiner* — Farzana Hossain

(57) ABSTRACT

A system for broadcasting inter-programme and/or intra-programme advertisements to a viewing or listening audience is disclosed. A given advertisement's target audience profile is matched to an obtained real audience profile to dictate not only that certain advertisements shall be broadcast only between and/or during certain programmes but also that certain individual members of, or groups of members within, the programme-receiving audience may receive one advertisement, during and/or between certain programmes, whilst other audience members or member groups receive a different advertisement, in one or more of the same respective advert 'slots', whilst watching or listening to the same broadcast.

24 Claims, 4 Drawing Sheets

SYSTEM FOR BROADCASTING TARGETED ADVERTISEMENTS

FIELD OF THE INVENTION

The invention relates to the electronic capture, analysis and delivery of mass media and consumer information and in particular to a system of broadcasting advertisements.

BACKGROUND TO THE INVENTION

Present mass media advertising models assign particular areas of interest to certain classes of consumers based on available demographic information. From this starting point mechanisms are developed to deliver the advertising content to as many potential consumers as possible whether:
  Over the air (radio stations);
  Via television (television networks);
  Via cable and/or satellite transmission; or by
  Mass distribution of printed copies (newspapers and magazines)

The main drawback with this approach is the lack of commercial efficiency in the existing models. Without reliable profiling demographic data on audiences and/or subscribers, individualisation and personalised targeting remains a tough challenge for the whole advertising industry. A too narrowly focused advertising campaign runs the risk of missing potential consumers and a too broadly focused campaign runs the risk of not attracting enough consumers as it may not be appealing enough.

Advertisers have always attempted to use targeting methodologies—direct mailing is one obvious example—to better identify and reach potential prospects or specific classification groups of purchasers. This has always been difficult in television where the underlying premise of broadcasting—one to many—has always prevailed. The attempts to match viewers to advertised products rely on assumptions about stereotypes rather than specific analysis and interpretations of individual consumer viewing patterns.

This absence of accurate prospect profiling data particularly in the TV medium means that identifying leveraging and retaining product responsive television audiences remains a largely unachieved priority for the advertising industry. This dilemma for television is made even more significant by advances in technology that increase the overall number of channel mix options available to the advertising campaign strategist i.e. message delivery at the touch of a button direct to a mobile phone.

Individuals at home, work or on the move now come into contact with an ever expanding number of different forms of mass media. Recent additions to the established and traditional options include:
  Broadband;
  Digital television;
  Digital radio;
  Webcasting;
  Internet audio streams; and
  Internet video streams.
The problem therefore is that:
  Advertisers globally would prefer to accurately target individual consumers based on an improved understanding of their propensity to purchase particular types of product and in order to maximise the overall effectiveness of their industry;
  Consumers would prefer to receive advertisements relating to products of personal interest rather than campaigns which have no relevance.
  At present there is no way of electronically matching the viewer to the playout material;
  Broadcasters need to capture accurate programme ratings and channel market share data since this forms a valuable currency for their industry. At present there is neither net-centric nor automated option for carrying out this type of measurement.

An objective of the present invention is to provide a system which addresses these problems.

SUMMARY OF THE INVENTION

In its broadest aspect, the invention provides a system for, broadcasting inter-programme and/or intra-programme advertisements to a viewing or listening audience, characterised in that the system comprises:
  means for obtaining real audience profiles;
  means for matching a given advertisement's target audience profile to said real audience profile; and
  means for dictating not only that certain advertisements shall be broadcast only between and/or during certain programmes but also that certain individual members of, or groups of members within, the programme-receiving audience may receive one advertisement, during and/or between certain programmes, whilst other audience members or member groups receive a different advertisement, in one or more of the same respective advert 'slots', whilst watching or listening to the same broadcast.

This concept may be applied to a wide range of implementations including cable, terrestrial, satellite networks and future systems such as those embodying broadband television technologies.

Such an arrangement largely overcomes (or at least mitigates) the drawbacks previously listed with respect to known mass media advertising models. In addition to the completely new design of an analysis tool and a database management engine the invention provides a software based link which brings both component parts of a complex value chain together and then automates playout of TV commercials as part of an end to end process.

In a subsidiary aspect in accordance with the invention's broadest aspect, the system stores further information such as a program buyer profile, time of broadcast and/or nature of broadcast and utilises an interface between the real audience profiles data stored and said further information to select appropriate advertisements.

This optional feature would allow even better tailored advertisements to be broadcast on a network by combining the information that is already usually readily available with the viewing habits of individuals. This may also allow a broadcaster to automatically modify its viewer classification dependent in part on criteria such as the nature of the program or the age of the program buyer. In other words, different classes of adverts may be sent to a particular television at different times. This would allow focused advertising despite several viewers viewing programs from the same television in sequence.

In a further subsidiary aspect, the system further comprises means allowing the viewer or listener to interact during an advertisement, means which store data as part of the audience profile to record any such interaction and means which may be set to trigger the release of further similarly classified advertisements to the viewer or listener in response to such interaction.

This optional feature allows fine tuning of the advertisement content sent to individuals. For example, if an individual interactively orders a brochure for a particular type of new motorcar, the system could store such data and send more adverts for similar or even the same motorcars to the viewer.

In a further subsidiary aspect, during a given broadcast with a plurality of advertisement breaks, the system is adapted to record for an individual audience the series of advertisements delivered during an initial break and then adjust the content of the following series of advertisements delivered during a subsequent break.

This would allow the system to deliver a tailored sequence of series of advertisements to the individual audience. It may for example choose a series of adverts which are best suited for the $1^{st}$ 15 minutes of viewing even when a viewer joins the broadcast part way through. This will further improve the efficiency of the adverts delivered to individual audiences.

In a further subsidiary aspect, where a given broadcast on a given channel has a plurality of advertisement breaks, the system is adapted to record for an individual audience whether the viewer switches to another channel during the break and the system comprises means to calculate which channel he or she is likely to switch to and tailor the advertisement delivered to said most probable channel to correspond to the audience in question.

This system will allow the audience to be delivered the adverts even when they try to change channels to avoid them.

In a further subsidiary aspect, the information identified such as the real audience profiles is stored remotely from the viewer/listener receiver units.

This will do away with the requirement to have each receiver unit incorporate bespoke memory devices. The system may therefore rapidly be integrated to the existing broadcasting infrastructure.

BRIEF DESCRIPTION OF THE DRAWINGS

A preferred embodiment of the present invention will now be described by way of example and with reference to the accompanying drawing in which.

DETAILED DESCRIPTION OF THE INVENTION

Figure 1:
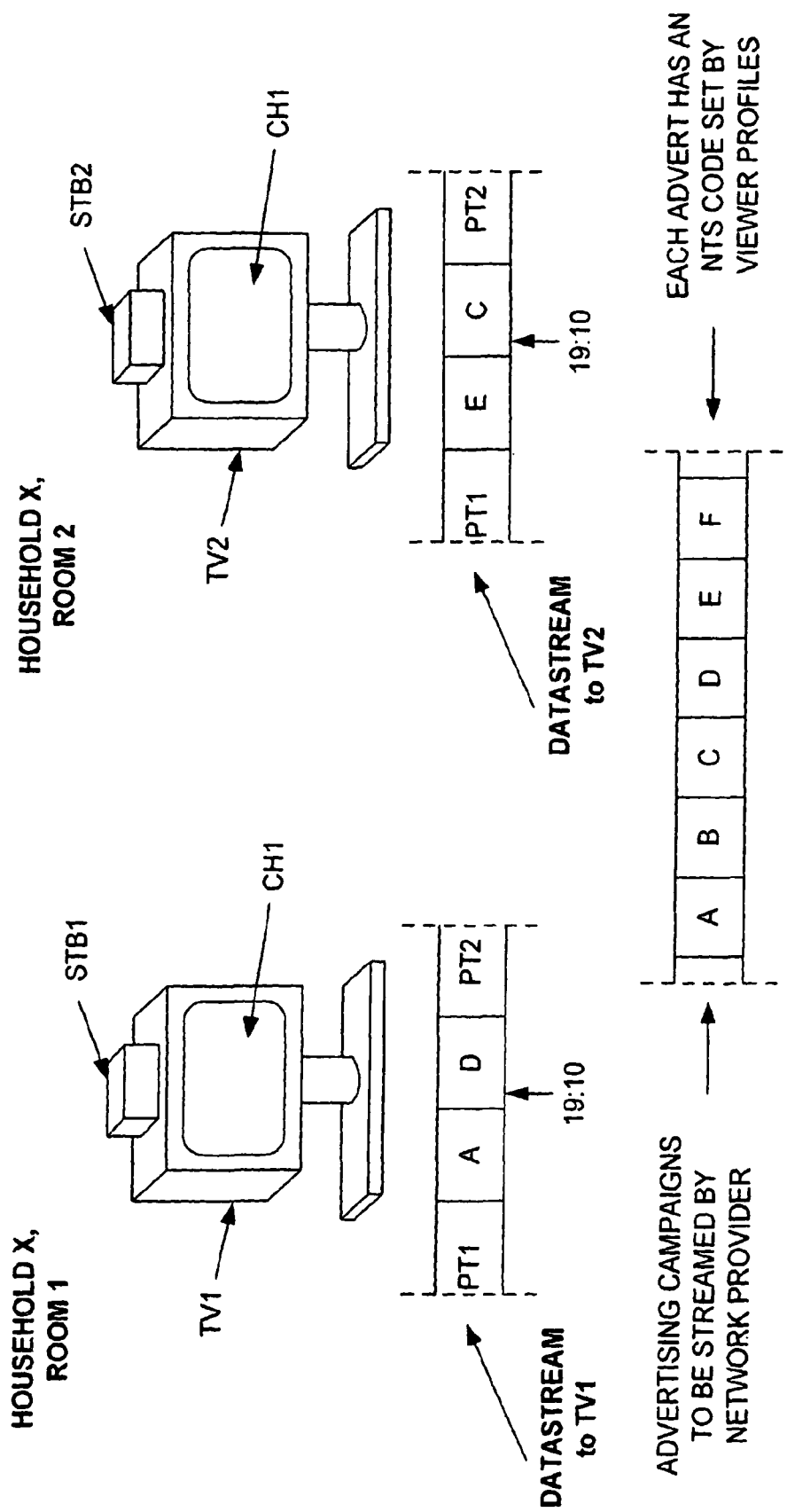
FIG. 1 shows a schematic representation of an operational system.

A system and method of linking consumers and advertising campaigns with the aim to provide individual targeted advertising is described.

We (i.e. the general public) think we are unique individuals but we unconsciously reveal elements of our character in everything that we do—from what we watch, read, listen to, wear, and what we eat. When these are collected together a person's character can be analysed, assigned a 'type' and used to successfully determine a propensity to buy certain types of product.

The system as defined by the present invention uses a viewing based analysis system (which may collate information as points) to obtain multiple layering of behavioural habits—the true secret of accurate targeting. Real live input feeds from continually refreshed mainstream broadcast sources are collated on an individual location basis via consumer specific IP addresses to form a centralised database which is used as an analysis platform (or in other words a management tool) to collate and develop these classification groupings. These subsequently form the basis and the main trigger for the automated playout of advertising material.

In operation, the service provider—who may either be a traditional broadcaster or a next generation video based ISP (Internet Service Provider)—transmits an interleaved data stream to a viewer/consumer. The incoming signal is decrypted and displayed as either an audio data stream, a video data stream, or a combined audio and video data stream on a variety of terminal devices.

The system may operate following these method steps:

Track and read the viewing habits of individual households in a given area;

Capture this information either locally or remotely in a deep level network environment;

Analyse and assign subsequent captured data into classification groups;

Create an output using this data which can be used as a decision tree to determine the suitability of particular individual households—via their classification group status—to receive particular types of advertising material according to that segmentation;

Separately classify all types of advertising by numerically tagging segments (abbreviated as NTS codes by the present applicant). These groupings will support the onward addressing of advertising material to appropriate target destinations;

Use this output seamlessly within appropriate software to provide listings of household identifications via destination addressing which can be used to direct advertising material from those central servers out to potential prospects using the new NTS codes;

Co-ordinate the play out of advertising from centrally located broadcast servers out to end consumers using the outputs described. This will involve the manipulation and management of individual broadcast streams.

Using television as an example medium a preferred embodiment of the present invention is will now be described.

An electrical signal of defined structure (interleaved audio and/or video data streams) is fed into households covered by a broadcasting network having at least one television viewing device which is able to detect, interpret and convert the data stream into a television picture containing programmes, trailers and advertisements.

A viewing profile is obtained as a result of analysing what is being watched on the television. Standard audience ratings are obtained by taking a snapshot of how many televisions are tuned into a certain channel at a certain instance in time—this only usefully tells you what channel is on not who might be watching it.

By interrogating a Set Top Box (STB) connected to the television and equipped with an individual IP address, a more accurate picture of the viewer can be built up over time and has the added feature that it is continually being updated.

Information such as the nature of the program may be utilised and the system may be equipped with an analysing interface set to identify that for individual addresses there are in fact a certain number of different viewers. The interface may identify that a particular household comprises a husband, a wife and a young child. This additional data may then be used to tailor the adverts to specific individuals during different periods throughout the day. The analysis of probabilities of who might be viewing a particular program may then be carried out. The system may even conclude that it is likely that all are watching a particular program and deliver the appropriate mix of adverts.

The system may be adapted to record any interaction of the viewer for those adverts with which a viewer interacts and to take into account the interaction to select future adverts to send to the user. Such information of interaction may also be stored and sent to the advertiser as proof of effectiveness of their adverts and the present inventive system.

The system may also be adapted to record viewer switching habits in order to deliver adverts at appropriate times to a secondary channel which may also correspond to the viewer's profile.

The system may also be adapted to measure the time the viewer has been receiving the broadcast and tailor the successive adverts' breaks in accordance.

STB's have unique electronic addresses which can be used to uniquely identify the television connected to the STB. As the viewing profile is formed the electronic address of the STB is its unique identifier. Substantially similar profiles are then grouped up into viewing clusters.

Advertising campaigns are categorised according to content and predetermined viewing profiles and reclassified by integrating Numerically Tagged Segment (NTS) codes into the bank of advertising campaigns pipelined for transmission.

NTS codes are associated with viewing clusters resulting in automatic play out of advertisements from broadcast networks matching adverts to suitable consumers. Consumer profiling is achieved across the broadcast network.

The broadcast capacity or bandwidth of the line or channel is effectively increased without the need of additional cables, connectors or the inevitable loss of service whilst such maintenance is being performed.

Broadcast networks provide a combination of multicast (traditional broadcasts) and unicast (Video on Demand—VOD) services. This system utilises a bridging protocol that supports multicast and unicast applications producing multicast application having unicast characteristics.

This protocol combined with an expiry mechanism achieves selective play-out from multiple video play-out. For any given advertisement slot multiple advertisements may be transmitted from the broadcast network but only those with the inbuilt expiry mechanism disabled will play out at the target destination.

The expiry mechanism or TTL (Time to Live), if set at a value approaching zero, causes the advertisement that it is assigned to, to effectively die on arrival at the target destination, i.e. play-out. Only advertisements with higher TTL's are played out.

Whilst, for example, eight adverts may be transmitted for a three advert slot, only three adverts are played out at the target destination and the content of the play-out may be different from one target destination to another.

The target destination is specified by the STB electronic address. This overcomes any data protection legal issues as at no time are viewer's individual details (name, age, location, occupation etc) used in anything other than an aggregated capacity.

The arrangement described is applicable to any multimedia transmission system capable of reaching mass audiences.

The whole invention is particularly advantageous because it has the additional benefit of being able to deliver accurate programme rankings and channel market share information using network embedded technology. This can be used to supplement the outmoded and inefficient measurement techniques based on random probability sampling which have been used for the last thirty years. It is envisaged that the present system will eventually replace these prior art systems over time.

The present system may have particular applications in the 'Video on Demand' (VOD) market. In this context, the system may be adapted to select appropriate adverts to accompany personal broadcasts such a pay per view film.

Against this background, FIGS. 1, 2, 3 and 4, and incorporated text references, are generally self explanatory.

Figure 2:
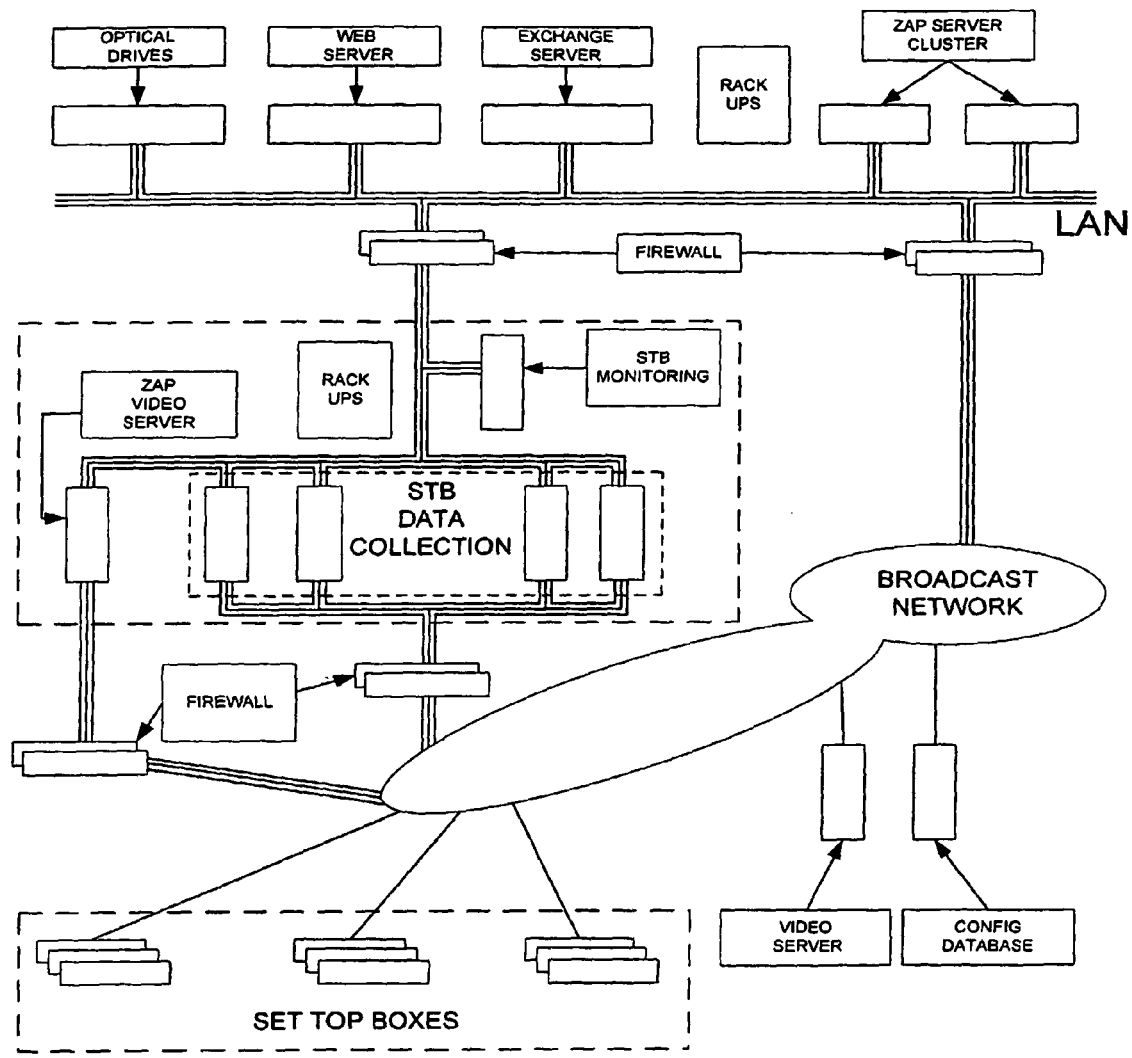
FIG. 2 shows a block representation of a typical system architecture.

In FIG. 2, an example of a system configuration is shown where part of the Zap system is co-located with the Host's broadcast source network and another part is located elsewhere. Alternatively, the entire Zap system can be co-located within the Host's source network.

The Host's broadcast source network comprises optical drives, Web or Internet servers, exchange servers, video servers and configuration database housed in racks along with uninterrupted power supplies (UPS). These are standard network components and as such require no further explanation.

The Zap video server, a stand-alone server preloaded with the system software is integrated into the Host's broadcast network. All components are linked to be able to communication with each other.

Alongside the Zap video server are the facilities to monitor the data collection from the STB's. Typically, when the polling pulse is fired to the STB and a return pulse of consumer data is received, this is stored by a data collector machine and each data collector machine can monitor 25,000 STB's. This data is used to perform the consumer profiling and from this profile the actual play-out to each target destination (STB) is determined.

Figure 3:
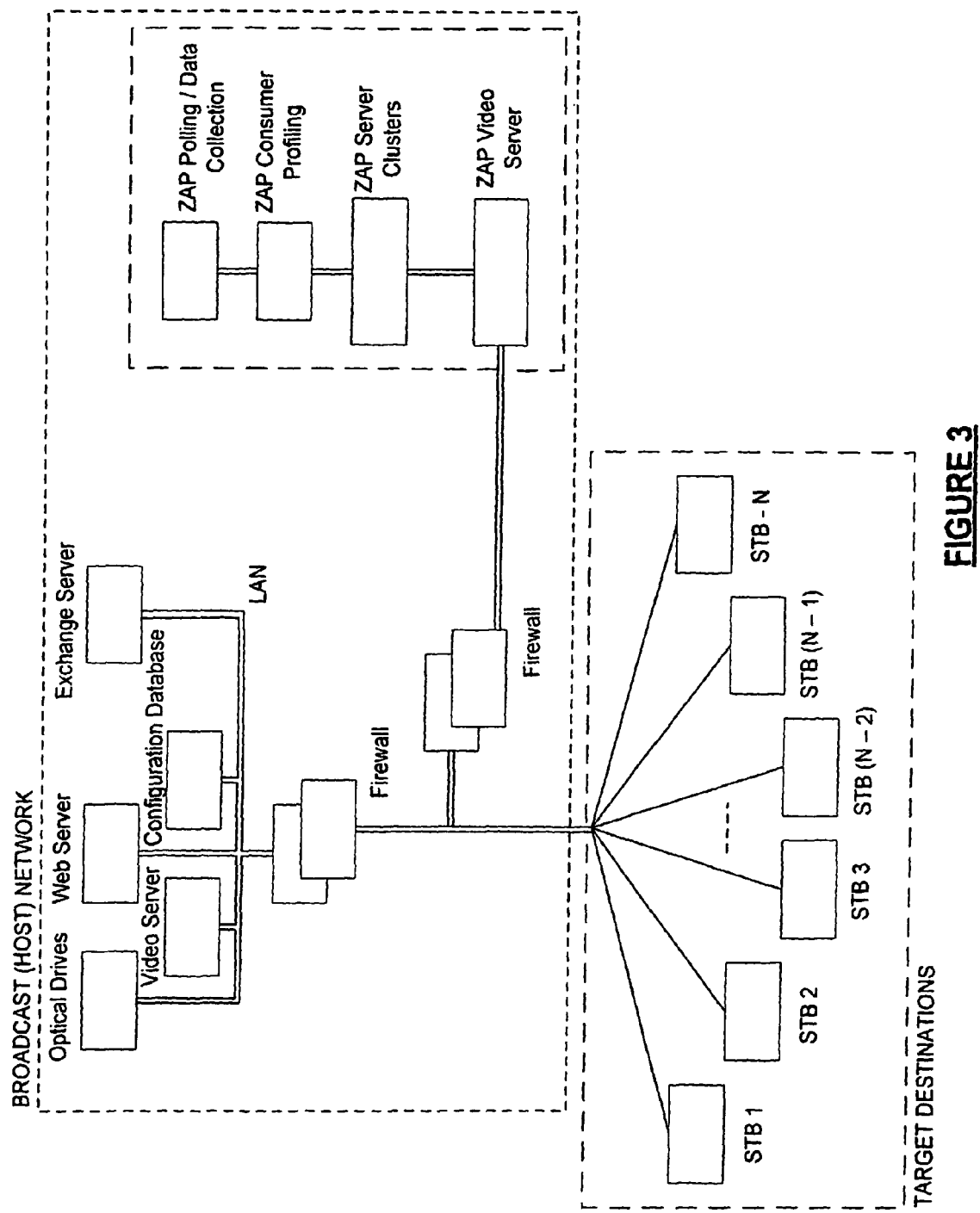
FIG. 3 shows an alternative block representing a typical system architecture.

FIG. 3 is a representation of the system wherein all of the Zap processes are located and performed within the broadcaster's or Host's source network at a single site.

Figure 4:
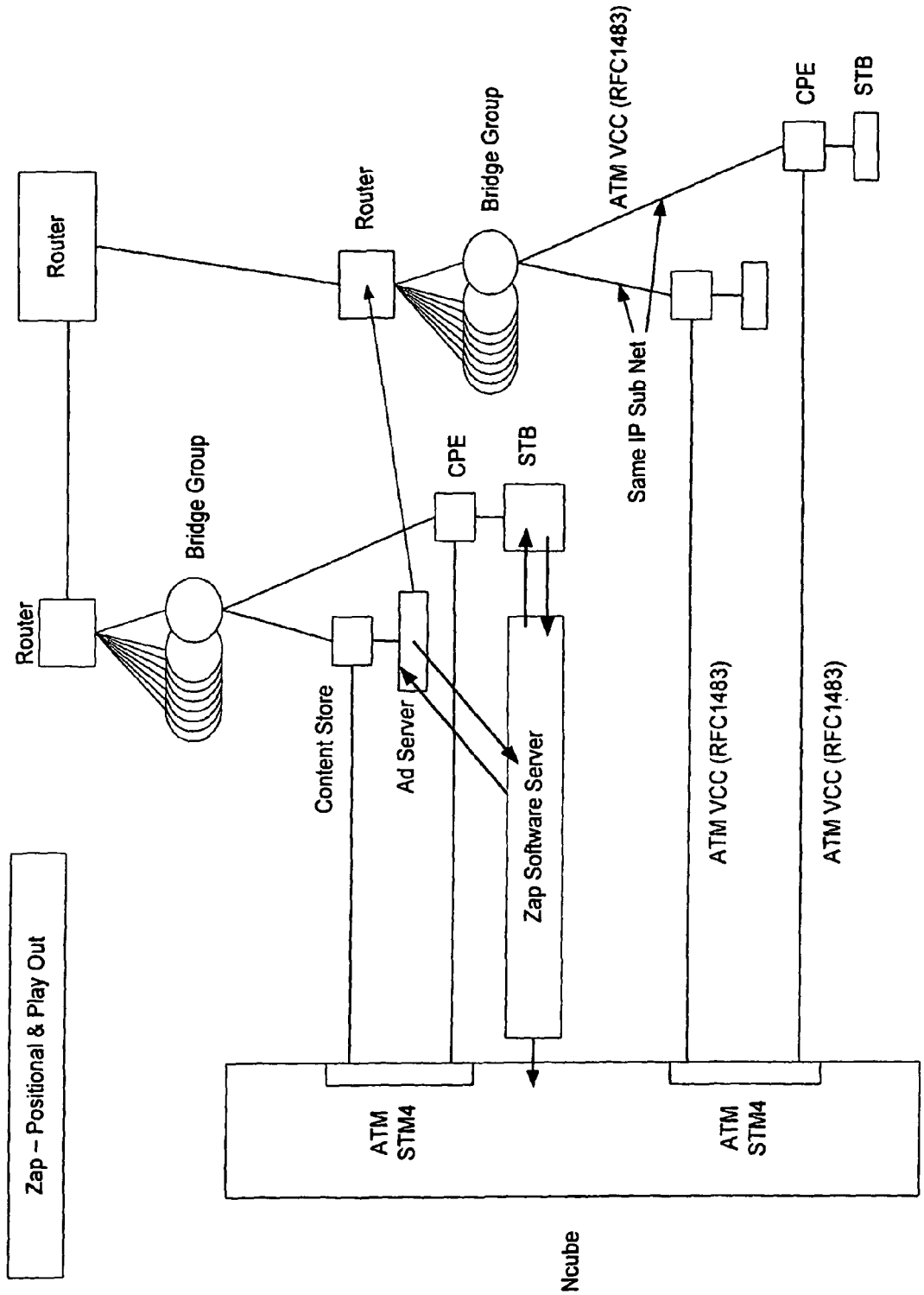
FIG. 4 shows a further alternative block representing a typical system architecture.

In FIG. 4, an alternative system configuration is shown. Here the interaction between the Zap server and the Host's network is clearly shown. The Bridge Group references relate to the bridging protocol, the content store is the complete set of advertisement, the ad server contains the tagged advertisements originally in the content store when untagged, CPE are consumer premises equipment and relate to individual households each having a related STB or set top box, ATM or Asynchronise Transfer Mechanism refers to the main network of the broadcaster.

The scope of the invention is defined by the claims which now follow.

The invention claimed is:

1. A system for broadcasting advertisements to an audience which comprises:
    a profile gatherer that creates programme-receiving audience profiles, the profile gatherer operating with an interrogator that interrogates set top boxes with individual IP addresses to determine the nature of programs viewed by the programme receiving audience for each IP address;
    a profile matcher that matches a given advertisement's target audience profile to one or more target audience profiles for each of a plurality of advertisements;
    a broadcaster that broadcasts the advertisements in an IP network environment using the target audience profiles and the programme-receiving audience profiles; and
    a dictator that dictates that the broadcast of certain identical multiple advertisements shall be initiated to different IP addresses within the programme-receiving audience in a same respective advertisement slot during the same broadcast;
    wherein:
        said profile matcher operates with an analyzer that analyzes viewer habits for particular IP addresses in order to generate different programme-receiving audience profiles for first and second target IP addresses; and said broadcaster transmits identical multiple advertisements to the first and second target IP addresses for the same advertisement slot, with each advertisement to each target IP address having a Time to Live (TTL) inbuilt expiry mechanism conforming to IP Network TTL protocol, the TTL being utilized to achieve selective play-out of the advertisements in the IP network environment, the selective play-out being achieved by setting the initial TTL values of some of the multiple advertisements to a value at or approaching zero so that those advertisements will expire before they can be played out at the target destination according to IP Network TTL protocol, and setting the TTL of other advertisements to higher initial values so that the other advertisements are successfully played out at the target destination using IP Network TTL protocol, the multiple advertisements including first and second subsets of advertisements respectively associated with the programme-receiving audience profiles of the first and second target IP addresses, the TTL value of at least one of the advertisements associated with the first subset being set differently than the TTL value of at least one of the advertisements associated with the second subset such that the subset of advertisements played out at the first target IP address is different than the subset of advertisements played out at the second target IP address for the same advertisement slot, thereby spoofing the IP network so that it appears to the IP network that all of the advertisements are being played out at both of the first and second target IP addresses even though only separate subsets of the advertisements respectively reach the first and second target IP addresses based on the initial TTL values of the advertisements.

2. A system according to claim 1, wherein the system collects data by polling or interrogating network/consumer interface devices in the IP network environment and then stores the data for analysis in a data collector located remotely from the set top boxes.

3. The system recited in claim 2, wherein the network/consumer interface devices comprise set top boxes.

4. A system according to claim 1, wherein the system uses advertising campaigns to target specific advertisements to specific viewers in the IP network environment.

5. A system according to claim 4, wherein advertising campaign material and/or mainstream broadcast content is collated, grouped, managed, and coordinated for the purpose of linking the profile groupings to relevant content in order to achieve both targeting and personalized delivery of content in the IP network environment.

6. A system according to claim 1, comprising a first server and/or database for obtaining programme-receiving profiles and at least a second server containing tagged advertisements which either are or can be classified in such a way as to make them targetable in the IP network environment.

7. A system according to claim 1, further comprising:
a receiver that receives the multiple advertisements from the broadcaster; and
a mechanism for controlling advertisements by allowing the play-out of only a portion of the multiple advertisements whilst the remaining portion of the multiple advertisements expires, based on the TTL values of each of the advertisements, the system thereby creating a targeting capability for delivery of personalized content and advertising material in the IP network environment.

8. A system according to claim 1, wherein the system stores further information such as the program buyer profile, time of broadcast and nature of broadcast and utilises an interface between the audience profiles data stored and said further information to select appropriate advertisements to play out to a selected audience in the IP network environment by setting the initial TTL values of the advertisements corresponding to each IP address accordingly.

9. A system according to claim 1, wherein the system monitors audience interaction during an advertisement, stores data from the audience interaction as part of the audience profile and triggers the release of further similarly classified advertisements to the audience using the information gained from the interactions, wherein the audience interaction monitoring, data storage, and triggering all occur in the IP network environment.

10. A system according to claim 1, wherein during a given broadcast with a plurality of advertisement breaks, the system is adapted to record for an individual audience the series of advertisements delivered during an initial break and then adjust the content of the following series of advertisements delivered during a subsequent break.

11. A system according to claim 1, wherein during a given broadcast on a given channel with a plurality of advertisement breaks, the system is adapted to record for an individual audience whether the viewer switches to another channel during the break and the system calculates which channel the viewer is likely to switch to and tailor the advertisement delivered to said most probable channel to correspond to the audience in question.

12. A system according to claim 1, wherein the audience profiles are stored remotely from viewer/listener receiver units.

13. The system recited in claim 12, wherein the audience profiles are network or carrier hosted for subsequent deployment in playing out advertisements or personalized content on a selective basis in the IP network environment.

14. A system according to claim 1, wherein the programme-receiving audience profiles are based on an analysis of individual audience member's viewing and/or listening habits over a period of time and the subsequent build up of these profiles into clusters of interest groups for content and advertisement targeting purposes so that selective advertisements can be played out to a selected audience by setting the initial TTL values of the individual IP addresses of each advertisement accordingly.

15. The system recited in claim 1, wherein the programme-receiving audience profiles are based solely on audience viewing and/or listening data accumulated by the interrogator.

16. A system for broadcasting advertisements to an audience which comprises:
a profile gatherer that creates program-receiving audience profiles for a program-receiving audience;
an interrogator that interrogates set top boxes with individual IP addresses, the profile gatherer operating with the interrogator to determine the nature of programs viewed by the program receiving audience for each IP address;
a profile matcher that matches a desired profile of a target audience for each of a plurality of advertisements to at least one program-receiving audience profile;
a broadcaster that broadcasts the advertisements in advertisement slots in an IP network environment using the target audience profiles and the program-receiving audience profiles;

a dictator that dictates that the broadcast of certain identical multiple advertisements shall be initiated to different IP addresses within the program-receiving audience in the same respective advertisement slot during the same broadcast;

an analyzer that analyzes viewer habits for particular IP addresses, the profile matcher operating with the analyzer to generate different program-receiving audience profiles for first and second IP addresses;

wherein the broadcaster transmits identical multiple advertisements to the first and second target IP addresses for the same advertisement slot, each advertisement to each target IP address having a Time to Live (TTL) inbuilt expiry mechanism conforming to IP Network TTL protocol, the TTL being utilized to achieve selective play-out of the advertisements, the selective play-out being achieved by setting the initial TTL values of some of the multiple advertisements to a value at or approaching zero so that the corresponding advertisements will expire before the advertisements can be played out at the target destination according to IP Network TTL protocol, and setting the TTL of other advertisements to higher initial values so that the other advertisements are successfully played out at the target destination according to IP Network TTL protocol, the multiple advertisements including first and second subsets of advertisements respectively associated with the programme-receiving audience profiles of the first and second target IP addresses, the TTL value of at least one of the advertisements associated with the first subset being set differently than the TTL value of at least one of the advertisements associated with the second subset such that the subset of advertisements played out at the first target IP address is different than the subset of advertisements played out at the second target IP address for the same advertisement slot, thereby spoofing the IP network so that it appears to the IP network that all of the advertisements are being played out at both of the first and second target IP addresses even though only separate subsets of the advertisements respectively reach the first and second target IP addresses based on the initial TTL values of the advertisements.

17. A system according to claim 16, further comprising:
a receiver that receives the multiple advertisements from the broadcaster; and
a mechanism for allowing the play-out of only a portion of the multiple advertisements in the IP network environment while the remaining portion of the multiple advertisements expires, based on the TTL values of each of the advertisements.

18. The system recited in claim 16, wherein the programme-receiving audience profiles are based solely on audience viewing and/or listening data accumulated by the interrogator.

19. A system for broadcasting advertisements to an audience which comprises:
a profile gatherer that creates programme-receiving audience profiles, the profile gatherer operating with an interrogator that interrogates set top boxes with individual IP addresses to determine the nature of programs viewed by the programme receiving audience for each IP address;
a profile matcher that matches a desired profile of a target audience for each of a plurality of advertisements to at least one programme-receiving audience profile;
a broadcaster that broadcasts the advertisements in advertisement slots in an IP network environment using the target audience profiles and the programme-receiving audience profiles, the programme-receiving audience profiles being based solely on an analysis of individual audience member's viewing and/or listening habits over a period of time and the subsequent build up of these profiles into clusters of interest groups for content and advertisement targeting purposes; and
a dictator that dictates that the broadcast of certain identical multiple advertisements shall be initiated to different IP addresses within the programme-receiving audience in the same respective advertisement slot during the same broadcast;

wherein:
said profile matcher uses viewer habits for particular IP addresses in order to generate programme-receiving audience profiles for first and second target IP addresses; and
said broadcaster transmits identical multiple advertisements to the first and second target IP addresses for the same advertisement slot, with each advertisement to each target IP address having a Time to Live (TTL) inbuilt expiry mechanism conforming to IP Network TTL protocol, the TTL being utilized to achieve selective play-out of the advertisements, the selective play-out being achieved by setting the initial TTL values of some of the multiple advertisements to a value approaching zero so that those advertisements will expire before they can be played out at the target destination according to IP Network TTL protocol, and setting the TTL of other advertisements to higher initial values so that the other advertisements are successfully played out at the target destination according to IP Network TTL protocol, the multiple advertisements including first and second subsets of advertisements respectively associated with the programme-receiving audience profiles of the first and second target IP addresses, the TTL value of at least one of the advertisements associated with the first subset being set differently than the TTL value of at least one of the advertisements associated with the second subset such that the subset of advertisements played out at the first target IP address is different than the subset of advertisements played out at the second target IP address for the same advertisement slot, thereby spoofing the IP network so that it appears to the IP network that all of the advertisements are being played out at both of the first and second target IP addresses even though only separate subsets of the advertisements respectively reach the first and second target IP addresses based on the initial TTL values set for individual advertisements.

20. A system according to claim 19, wherein the system uses advertising campaigns to target specific advertisements to specific viewers, such that advertising campaign material and/or mainstream broadcast content can be collated, grouped, managed, and coordinated for the purpose of linking the profile groupings to relevant content in order to achieve both targeting and personalized delivery of content in the IP network environment.

21. The system recited in claim 19, wherein the programme-receiving audience profiles are based solely on audience viewing and/or listening data accumulated by the interrogator.

22. A method for broadcasting advertisements to an audience, comprising:

interrogating set top boxes with individual IP addresses to determine the nature of programs viewed by a program-receiving audience for each IP address;

creating program-receiving audience profiles for the program-receiving audience;

matching a a desired profile of a target audience to at least one program-receiving audience profile;

generating program-receiving audience profiles for first and second target IP addresses by analyzing viewer habits for the first and second target IP addresses;

dictating that the broadcast of identical multiple advertisements shall be initiated to the first and second IP addresses in a same advertisement slot during a same broadcast; and broadcasting the identical multiple advertisements in an IP network environment by transmitting the identical multiple advertisements to the first and second target IP addresses for the same advertisement slot, each advertisement to each target IP address having a Time to Live (TTL) inbuilt expiry mechanism conforming to IP Network TTL protocol, the TTL being utilized to achieve selective play-out of the advertisements, the selective play-out being achieved by setting the initial TTL values of some of the multiple advertisements to a value approaching zero so that the corresponding advertisements will expire before the advertisements can be played out at the target destination according to IP Network TTL protocol, and setting the TTL of other advertisements to higher initial values so that the other advertisements are successfully played out at the target destination according to IP Network TTL protocol, the multiple advertisements including first and second subsets of advertisements respectively associated with the programme-receiving audience profiles of the first and second target IP addresses, the TTL value of at least one of the advertisements associated with the first subset being set differently than the TTL value of at least one of the advertisements associated with the second subset such that the subset of advertisements played out at the first target IP addresses is different than the subset of advertisements played out at the second target IP address for the same advertisement slot, thereby spoofing the IP network so that it appears to the IP network that all of the advertisements are being played out at both of the first and second target IP addresses even though only separate subsets of the advertisements respectively reach the first and second target IP addresses based on the initial TTL values of the advertisements determined by the profiles.

23. The method recited in claim 22, further comprising:
receiving one of the identical multiple advertisements; and
playing-out a portion of the received multiple advertisements while the remaining portion of the received multiple advertisements expires, based on the TTL values of each of the advertisements.

24. The method recited in claim 22, wherein creating program-receiving audience profiles comprises creating program-receiving audience profiles based solely on audience viewing and/or listening data received by the interrogation of the set top boxes.

* * * * *